(12) United States Patent
Hong

(10) Patent No.: US 12,513,769 B2
(45) Date of Patent: Dec. 30, 2025

(54) DELAY DETERMINATION METHOD AND APPARATUS

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 364 days.

(21) Appl. No.: 18/035,063

(22) PCT Filed: Nov. 3, 2020

(86) PCT No.: PCT/CN2020/126285
§ 371 (c)(1),
(2) Date: May 2, 2023

(87) PCT Pub. No.: WO2022/094773
PCT Pub. Date: May 12, 2022

(65) Prior Publication Data
US 2024/0015832 A1 Jan. 11, 2024

(51) Int. Cl.
H04W 76/20 (2018.01)
H04W 60/04 (2009.01)

(52) U.S. Cl.
CPC ........ H04W 76/20 (2018.02); H04W 60/04 (2013.01)

(58) Field of Classification Search
None
See application file for complete search history.

(56) References Cited

U.S. PATENT DOCUMENTS

| | | | |
|---|---|---|---|
| 8,385,893 B2 | 2/2013 | Gupta et al. | |
| 9,204,256 B2 | 12/2015 | Lin et al. | |
| 9,661,460 B2 | 5/2017 | Lin et al. | |
| 2012/0172011 A1 | 7/2012 | Gupta et al. | |
| 2014/0003348 A1* | 1/2014 | Velev | H04W 60/06 370/328 |
| 2014/0064069 A1* | 3/2014 | Liao | H04W 76/18 370/230 |
| 2014/0256283 A1 | 9/2014 | Lin et al. | |
| 2016/0057570 A1 | 2/2016 | Lin et al. | |
| 2019/0059067 A1* | 2/2019 | Lee | H04L 67/141 |
| 2020/0337093 A1 | 10/2020 | Kim et al. | |

(Continued)

FOREIGN PATENT DOCUMENTS

| | | |
|---|---|---|
| CN | 103314624 A | 9/2013 |
| CN | 107734590 A | 2/2018 |

(Continued)

OTHER PUBLICATIONS

State Intellectual Property Office of the People's Republic of China, Office Action and Search Report Issued in Application No. 2020800030513, Jan. 30, 2024, 15 pages.

(Continued)

*Primary Examiner* — Lonnie V Sweet
(74) *Attorney, Agent, or Firm* — Volpe Koenig

(57) ABSTRACT

A delay determination method, apparatus, and computer-readable medium that improves a resource utilization rate in a wireless network. The resource utilization rate is improved by: in response to receiving a busy indication sent by a terminal, delaying a determination process associated with a reachable state of the terminal.

15 Claims, 3 Drawing Sheets

(56) References Cited

U.S. PATENT DOCUMENTS

| | | | |
|---|---|---|---|
| 2021/0127351 A1* | 4/2021 | Stojanovski | H04W 48/16 |
| 2022/0217707 A1* | 7/2022 | Zhou | H04W 72/21 |
| 2022/0330202 A1* | 10/2022 | Kumar | H04W 60/00 |

FOREIGN PATENT DOCUMENTS

| | | |
|---|---|---|
| CN | 108347695 A | 7/2018 |
| CN | 110062375 A | 7/2019 |
| CN | 110650529 A | 1/2020 |
| EP | 1942685 A1 | 7/2008 |
| EP | 3742774 A1 | 11/2020 |
| JP | 2019216486 A | 12/2019 |
| WO | 2019128622 A1 | 7/2019 |
| WO | 2019218780 A1 | 11/2019 |

OTHER PUBLICATIONS

State Intellectual Property Office of the People's Republic of China, Office Action and Search Report Issued in Application No. 2020800030513, Apr. 19, 2024, 13 pages.

ISA State Intellectual Property Office of the People's Republic of China, Written Opinion of the International Searching Authority Issued in Application No. PCT/CN2020/126285, Jul. 26, 2021, WIPO, 6 pages.

Vodafone, "P-CR (TS24.301), Adding E-UTRAN Deactivate ISR Timer description", 3GPP TSG CT WG1 Meeting #56 Shanghai, P.R. China, Nov. 10-14, 2008, C1-084765, 6 pages.

Vivo, "Handling of the periodic registration update timer and implicit de-registration timer", 3GPP TSG-CT WG1 Meeting #108 ,Gothenburg (Sweden), Jan. 22-26, 2018, C1-180133, 5 pages.

Nortel, "Indication of the channel to be used for uplink requests", 3GPP TSG-GERAN Meeting #30, Lisbon, Portugal, Jun. 26-30, 2006, G2-061289, 18 pages.

3GPP tsg_sa\wg2_arch, "23501-fa0_CRs_Implemented", Jun. 26, 2020, 245 pages. (Submitted in 2 parts).

3GPP tsg_ct\WG1_mm-cc-sm_ex-CN1, "TDoc_List_Meeting_CT1#87" (2014).

Sony, "Solution KI#1: Busy Indication as a paging response", SA WG2 Meeting #136, Nov. 18-22, 2019, Reno, US, S2-1912692 (revision of S2-1912408 was S2-1911141), 6 pages.

ISA State Intellectual Property Office of the People's Republic of China, International Search Report Issued in Application No. PCT/CN2020/126285, Jul. 26, 2021, WIPO, 4 pages.

* cited by examiner

DELAY DETERMINATION METHOD AND APPARATUS

CROSS-REFERENCE TO RELATED APPLICATION

The present application is a U.S. National Stage of International Application No. PCT/CN2020/126285, filed on Nov. 3, 2020, the contents of which are incorporated herein by reference in their entirety for all purposes.

TECHNICAL FIELD

The present disclosure relates to the field of communication technologies, and in particular, to delay determination methods and apparatuses, electronic devices, and computer-readable storage media.

BACKGROUND

In mobile communication technology, in order to obtain a service provided by a network, a terminal needs to register with the network first.

After registering with the network, the terminal can acquire a periodic registration update timer configured by the network, so as to periodically update a registration area to the network according to the periodic registration update timer.

The network can maintain a mobile reachable timer and an implicit detach timer for a registered terminal, and can determine a state of the terminal according to the timers and a received periodic registration area update message sent by the terminal.

However, a terminal may be in a situation where it is not convenient to update the periodic registration area. For example, when one Subscriber Identity Module (SIM) in a multi-SIM terminal is communicating, the other SIM may not be convenient to update the periodic registration area. In this case, how to prevent a state of such terminal from being wrongly determined by the network because the periodic registration area is not updated in time, for example, being wrongly marked as unreachable or wrongly detached, has become an urgent problem to be solved.

SUMMARY

Embodiments of the present disclosure propose delay determination methods, to solve technical problems in related technologies.

According to a first aspect of the present disclosure, a delay determination method is proposed, which is applied to a core network, and the method includes:
 in response to receiving a busy indication sent by a terminal, delaying a determination process associated with a reachable state of the terminal.

According to a second aspect of the present disclosure, a delay determination method is proposed, which is applied to a terminal, arranging at least a first SIM and a second SIM, and the method includes:
 in response to determining a conflict between an operation of updating a registration area of the second SIM and a communication operation of the first SIM, sending a busy indication to a core network corresponding to the second SIM; where the busy indication is used to request the core network to delay a determination process associated with a reachable state of the terminal.

According to a third aspect of the present disclosure, a delay determination apparatus is proposed, which is applied to a core network, and the apparatus includes:
 a delay module, configured to in response to receiving a busy indication sent by a terminal, delay a determination process associated with a reachable state of the terminal.

According to a fourth aspect of the present disclosure, a delay determination apparatus is proposed, which is applied to a terminal, arranging at least a first SIM and a second SIM in the terminal, and the apparatus includes:
 a sending module, configured to in response to determining a conflict between an operation of updating a registration area of the second SIM and a communication operation of the first SIM, sending a busy indication to a core network corresponding to the second SIM; where the busy indication is used to request the core network to delay a determination process associated with a reachable state of the terminal.

According to a fifth aspect of the present disclosure, an electronic device is proposed, including:
 a processor; and
 a memory, configured to store processor-executable instructions;
 where the processor is configured to implement the delay determination method described above.

According to a sixth aspect of the present disclosure, a computer-readable storage medium is proposed, on which a computer program is stored, which, when executed by a processor, realizes the steps in the delay determination method described above.

BRIEF DESCRIPTION OF THE DRAWINGS

In order to describe the technical solution in the embodiments of the present disclosure more clearly, accompanying drawings needed in the description of the embodiments will be briefly introduced below. Obviously, the accompanying drawings in the following description are only some embodiments of the present disclosure, and for those of ordinary skills in the art, other accompanying drawings can also be obtained according to these accompanying drawings without making creative efforts.

DETAILED DESCRIPTION OF THE EMBODIMENTS

In the following, the technical solution in the embodiments of the present disclosure will be clearly and completely described with reference to the accompanying drawings. Obviously, the described embodiments are only part of the embodiments of the present disclosure, but not all of the embodiments. Based on the embodiments in the present disclosure, all other embodiments obtained by those of ordinary skill in the art without making creative efforts belong to the protection scope of the present disclosure.

According to the embodiments of the present disclosure, a terminal can request the core network to delay a determination process associated with a reachable state of the terminal by a busy indication, so as to prevent the state of the terminal from being wrongly determined, and avoid the waste of communication resources caused by subsequent state updates. For example, a de-registration of the terminal can be delayed, so as to prevent the terminal from being wrongly de-registered while it is still within a coverage area of the core network, and avoid situations such as the waste of communication resources caused by the re-registration of terminals in the following processes.

Figure 1:
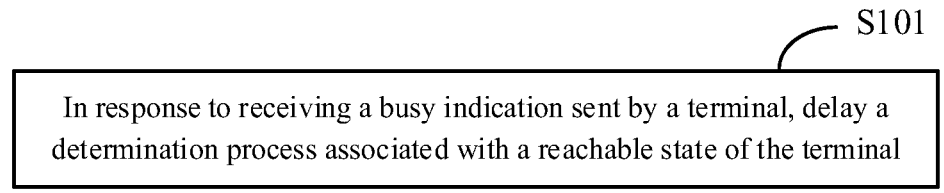
FIG. 1 is a schematic flowchart of a delay determination method illustrated according to an embodiment of the present disclosure.

FIG. 1 is a schematic flowchart of a delay determination method illustrated according to an embodiment of the present disclosure. The delay determination method shown in this embodiment can be applied to a core network, including but not limited to a 4G core network, a 5G core network, and a 6G core network. The core network can communicate with a terminal as user equipment, including but not limited to a mobile phone, a tablet computer, a wearable device, a sensor, an Internet of Things device, and other electronic devices. In an embodiment, the terminal may be a terminal to which a delay determination method in any subsequent embodiment applies.

As shown in FIG. 1, the delay determination method may include the following step:

at step S101, in response to receiving a busy indication sent by a terminal, a determination process associated with a reachable state of the terminal is delayed.

In an embodiment, after registering with a core network, the terminal may acquire a timing duration from the core network for setting a periodic registration update timer. The terminal may periodically initiate a registration area update according to the periodic registration update timer, so as to indicate to the core network that the terminal is still within a network coverage. For example, the terminal can initiate the registration area update to the core network after the periodic registration update timer expires.

In the core network, a mobile reachable timer and an implicit detach timer can be maintained for a registered terminal, and a duration of the mobile reachable timer is slightly longer than that of the periodic registration update timer configured for the terminal.

When the terminal enters an idle state, the core network starts the mobile reachable timer. If a message of updating a terminal registration area is received before the mobile reachable timer expires, the mobile reachable timer is stopped; and if the message of updating the registration area of the terminal is not received after the mobile reachable timer expires, a paging processing indication bit, i.e., PPF (Paging Proceed Flag), of the terminal is cleared to mark the terminal as unreachable, so that paging to the terminal will not be triggered. Once the mobile reachable timer expires, the core network will start the implicit detach timer. If the message of updating the terminal registration area is received before the implicit detach timer expires, the implicit detach timer is stopped, and the PPF is set (that is, marking the terminal as reachable); and if the message of updating the terminal registration area is not received after the implicit detach timer expires, the implicit detach of the terminal is initiated. It should be noted that after the core network initiates an implicit detach of the terminal, the terminal needs to re-attach to the core network later, which requires more communication resources.

Generally, when the terminal is not within the coverage of the network, the terminal will not update the registration area for a long time, which in turn causes the mobile reachable timer and the implicit detach timer in the core network to expire. However, when the periodic registration update timer of the terminal expires, the terminal may be in a situation where it is inconvenient to update the periodic registration area. Although the terminal is still within the coverage of the network, it is not necessary for the core network to mark the terminal as unreachable or de-registered, but the terminal fails to update the registration area in time, thus causing the core network to make a wrong determination of the reachable state of the terminal.

For example, for a terminal provided with a first SIM and a second SIM, when the first SIM is communicating, a periodic registration update timer of the second SIM expires. If the second SIM updates a registration area, an ongoing communication service of the first SIM will be affected; and if the second SIM does not update the registration area in time, the second SIM may be marked as unreachable by a core network, or even be detached. In this case, the second SIM may still be within the coverage of the network corresponding to the core network, but due to the detach, when the second SIM needs to access the core network, it is necessary to re-initiate an attach process, which wastes communication resources.

In view of the above technical problem, the present disclosure proposes a new delay determination method, in which a core network can delay a determination process associated with a reachable state of a terminal.

In an embodiment, the core network can receive a busy indication sent by the terminal, and delay the determination process associated with the reachable state of the terminal in the core network.

In an embodiment, the reachable state of the terminal indicates whether the terminal is reachable for AMF (Access and Mobility Management Function) in the core network, so the reachable state includes reachable or unreachable. In an embodiment, the determination process associated with the reachable state of the terminal includes two types. One is to determine whether the mobile reachable timer has expired, when the mobile reachable timer has not expired, the terminal can be determined to be reachable, and when the mobile reachable timer has timed out, the terminal can be marked as unreachable. The second is to determine whether the implicit detach timer has expired, and when the implicit detach timer has expired, de-register the terminal.

In an embodiment, a terminal sending the busy indication may be a multi-SIM terminal. For example, for a terminal equipped with at least a first SIM and a second SIM, in response to determining a conflict between an operation of updating a registration area of the second SIM and a communication operation of the first SIM, sending a busy indication to a core network corresponding to the second SIM. Based on this, after receiving the busy indication sent by the second SIM, the corresponding core network can delay the determination process associated with the reachable state of the second SIM.

It should be noted that, for the core network, each SIM corresponds to a terminal, and it does not distinguish whether it is a multi-SIM terminal.

So far, the embodiment shown in FIG. 1 has been completed. According to the embodiment shown in FIG. 1, the terminal can indicate the core network to delay the determination process associated with the reachable state of the terminal by the busy indication, so as to prevent the state of the terminal from being wrongly determined, thereby avoiding the waste of communication resources caused by subsequent state updates. For example, the de-registration of the terminal can be delayed, so as to prevent the terminal from being wrongly de-registered while it is still within the coverage area of the core network, and avoid situations such as the waste of communication resources caused by the re-registration of terminals in the following processes.

Figure 2:
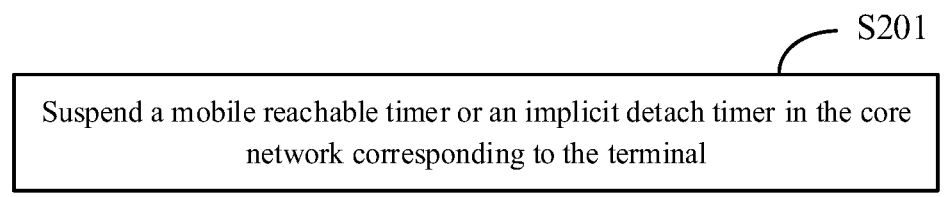
FIG. 2 is a schematic flowchart of another delay determination method illustrated according to an embodiment of the present disclosure.

FIG. 2 is a schematic flowchart of another delay determination method illustrated according to an embodiment of the present disclosure.

As shown in FIG. 2, delaying a determination process associated with a reachable state of the terminal includes:
at step S201, a mobile reachable timer or an implicit detach timer in the core network corresponding to the terminal is suspended.

In an embodiment, a busy indication sent by the terminal is used to request the core network to suspend the mobile reachable timer, or the implicit detach timer.

After receiving the busy indication sent by the terminal, the core network can first determine the timer that is currently counting, which can be, for example, the mobile reachable timer or implicit detach timer, and then suspend the timer currently counting.

In an embodiment, the core network can specifically determine which timer to be suspended according to whether the mobile reachable timer expires.

In response to determining the mobile reachable timer corresponding to the terminal not expiring, the mobile reachable timer is paused.

In response to determining the mobile reachable timer corresponding to the terminal expiring, the implicit detach timer is paused.

In an embodiment, the method further includes: restarting the mobile reachable timer in response to receiving a registration area update request of the terminal after suspending the mobile reachable timer or implicit detach timer.

After the core network suspends the timer according to the above embodiment, the core network is in a state of waiting for the terminal to initiate the registration area update. Subsequently, if the core network receives a registration area update request from the terminal, it stops the suspended timer. It should be understood that if the core network can determine that the terminal is reachable after receiving the registration area update request of the terminal, and at this time, the core network can restart the mobile reachable timer.

It should be noted that "restarting the mobile reachable timer" can be: counting from the beginning again according to a configured timing duration of the mobile reachable timer. Taking the timing duration of the mobile reachable timer being 10 ms as an example, in this embodiment, assuming that the mobile reachable timer is suspended when it reaches 6 ms, the core network will restart the mobile reachable timer from 0 ms after receiving the registration area update request sent by the terminal.

In an embodiment, it also includes an alternative solution, which can replace restarting the mobile reachable timer with continuing to start the suspended timer. For example, if the suspended timer is a mobile reachable timer, continue to start the mobile reachable timer; or if the suspended timer is an implicit detach timer, continue to start the implicit detach timer. For example, if the mobile reachable timer is suspended when it reaches 6 ms, the core network will resume the mobile reachable timer after receiving the registration area update request sent by the terminal (that is, the timer will continue counting from 6 ms, for example, assuming that the timer is set to a total time of 10 ms, the mobile reachable timer will continue to count for 4 ms) until the remaining time duration ends. Or, if the implicit detach timer is suspended when it reaches 6 ms, the core network will resume the implicit detach timer after receiving the registration area update request sent by the terminal (that is, continue counting after 6 ms, as described above).

So far, the embodiment shown in FIG. 2 has been completed. According to the embodiment shown in FIG. 2, after receiving the busy indication from the terminal, the core network will suspend the timer currently counting and wait for the terminal to initiate the registration area update. Therefore, it can be avoided that the terminal is still in the coverage area of the core network, but it is wrongly marked as unreachable or even wrongly detached because it is inconvenient to update the registration area, thus avoiding the waste of communication resources.

Figure 3:
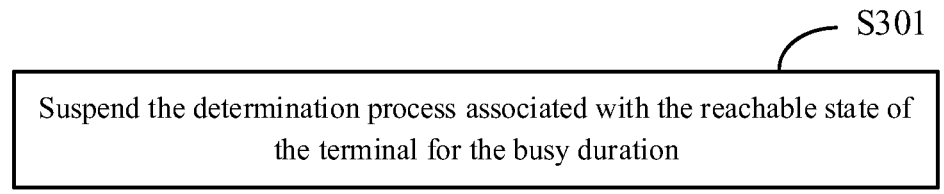
FIG. 3 is a schematic flowchart of another delay determination method illustrated according to an embodiment of the present disclosure.

FIG. 3 is a schematic flowchart of another delay determination method illustrated according to an embodiment of the present disclosure.

As shown in FIG. 3, the busy indication includes a busy duration. Delaying a determination process associated with a reachable state of the terminal includes:
at step S301, the determination process associated with the reachable state of the terminal is suspended for the busy duration.

After receiving the busy indication sent by the terminal, the core network can first determine the timer that is currently counting, which can be, for example, the mobile reachable timer or implicit detach timer, and then suspend the timer.

In an embodiment, the method for determining the currently running timer may be similar to the method in the embodiment shown in FIG. 2. In response to determining the mobile reachable timer corresponding to the terminal not expiring, it is determined that the currently counting timer is the mobile reachable timer; and in response to determining the mobile reachable timer corresponding to the terminal expiring, it is determined that the currently counting timer is the implicit detach timer.

In an embodiment, the core network may pause the timer for the busy duration according to the busy duration carried by the busy indication.

In response to determining the mobile reachable timer corresponding to the terminal not expiring, the mobile reachable timer is suspended for the busy duration; and in response to determining the mobile reachable timer corresponding to the terminal expiring, the implicit detach timer is suspended for the busy duration.

It should be noted that the core network suspends the timer for the busy duration may be: the core network suspends the timer, and continues to start the timer after the busy duration. The "continue to start the timer" may be: first suspend counting of the timer, and then resume the counting of the timer after the busy duration (that is, the timer continues to count from the time when the timer is suspended). For example, taking the timing duration of a timer being 10 ms as an example, assuming that the timer is suspended when it reaches 6 ms, after the busy duration (for example, after a duration of 20 ms), the timer is caused to continue to count from 6 ms, until the rest of the timing duration ends.

The core network suspends the mobile reachable timer for the busy duration may be: the core network suspends the mobile reachable timer first, and then continues to start the mobile reachable timer after the busy duration; and subsequently, if the mobile reachable timer expires, the terminal is marked as unreachable, and the implicit detach timer is started, and there is no need to suspend the implicit detach timer. The core network suspends the implicit detach timer for the busy duration may be: the core network suspends the implicit detach timer first, and then continues to start the implicit detach timer after the busy duration; and subsequently, if the implicit detach timer expires, the terminal is de-registered.

It should be noted that, in an embodiment, when the busy indication does not include the busy duration, the core network may also suspend the determination process associated with the reachable state of the terminal for a specified duration. For example, the specified duration may be preset. For example, in response to determining the mobile reachable timer corresponding to the terminal not expiring, the mobile reachable timer is suspended for the preset duration; and in response to determining the mobile reachable timer corresponding to the terminal expiring, and if the implicit detach timer does not expire, the implicit detach timer is suspended for the preset duration.

According to the embodiment shown in FIG. 3, after receiving the busy indication of the terminal, the core network may suspend the timer currently counting for the busy duration, so as to delay the determination that the terminal is unreachable or the de-registration. On the one hand, it can prevent a state of the terminal from being wrongly determined due to the inconvenience of updating a registration area by the terminal, such as being wrongly detached. On the other hand, the timer can be resumed in time to prevent the timer from being in a suspended state all the time, which can improve a resource utilization rate.

In an embodiment, the core network can suspend the mobile reachable timer or implicit detach timer by setting a new busy timer. Next, it will be described with reference to FIG. 4 and FIG. 5.

Figure 4:
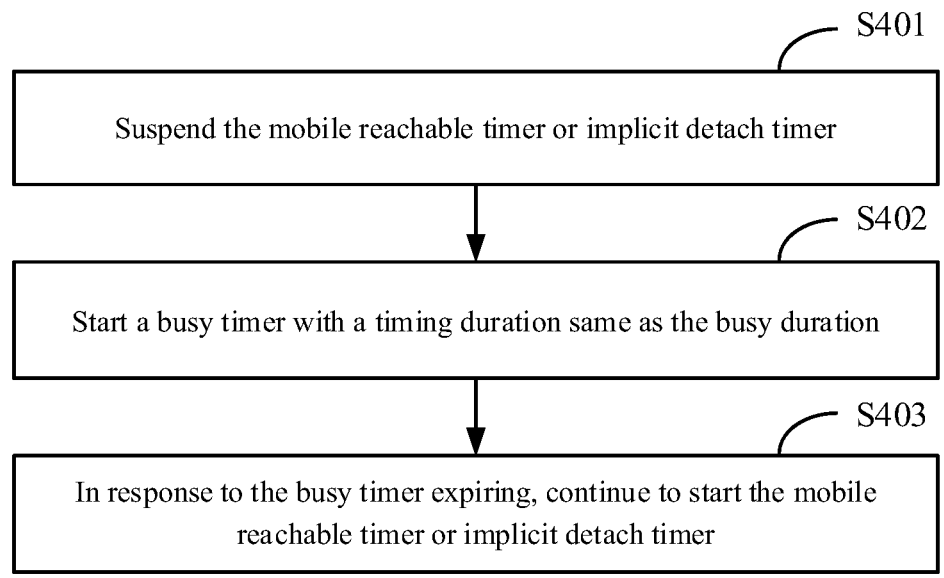
FIG. 4 is a schematic flowchart of another delay determination method illustrated according to an embodiment of the present disclosure.

FIG. 4 is a schematic flowchart of another delay determination method illustrated according to an embodiment of the present disclosure.

As shown in FIG. 4, the suspending of the mobile reachable timer or implicit detach timer corresponding to the terminal in the core network for the busy duration includes the following.

At step S401, the mobile reachable timer or implicit detach timer is suspended.

At step S402, a busy timer with a timing duration same as the busy duration is started.

At step S403, in response to determining the busy timer expiring, the mobile reachable timer or implicit detach timer is continued to start.

After receiving the busy indication, the core network may first determine the timer currently being counted according to whether the mobile reachable timer has expired. For example, it may be a mobile reachable timer or an implicit detach timer. Then, the core network may suspend the timer and simultaneously start another timer whose timing duration is consistent with the busy duration indicated by the busy indication. Then, after the busy timer expires, restart the timer that was suspended before.

Figure 5:
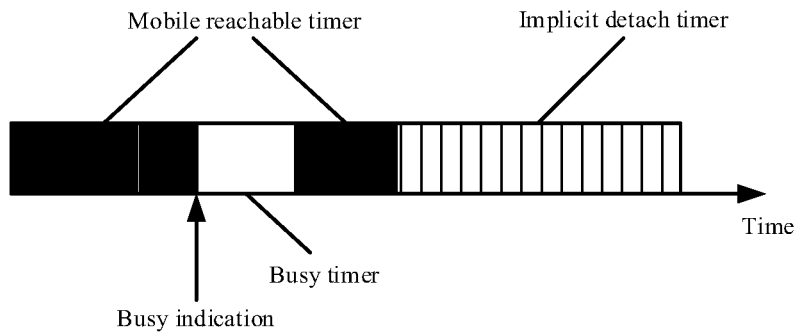
FIG. 5 is a schematic diagram of a counting method of a timer according to an embodiment of the present disclosure.

As shown in FIG. 5, the black filled part in the figure represents a mobile reachable timer; the white filled part in the figure represents a busy timer; and a filling pattern in the figure, which has vertical stripes, represents an implicit detach timer.

After receiving a busy indication sent by a terminal, a core network can determine the timer that is currently counting. Take an example of determining that a timer that is currently counting is a mobile reachable timer. Firstly, the mobile reachable timer can be suspended. For example, the mobile reachable timer suspends counting, and the busy timer is started at the same time, so that the busy timer starts to count. If a registration area update message sent by the terminal is not received after the busy timer expires, the mobile reachable timer will continue to be started. For example, the mobile reachable timer continues to count from the suspended time. If the registration area update message sent by the terminal is not received after the mobile reachable timer expires, the terminal is marked as unreachable, and an implicit detach timer is started to start counting. Subsequently, the implicit detach timer will not be suspended, and if the implicit detach timer expires, the terminal will be de-registered.

It should be noted that FIG. 5 is only an example of determining that the timer currently counting is a mobile reachable timer. In an embodiment, after receiving the busy indication sent by the terminal, if the core network determines that the current mobile reachable timer has expired, the core network can determine that the timer currently counting is an implicit detach timer. At this time, the implicit detach timer can be suspended, and the busy timer can be started at the same time. After the busy timer expires, the implicit detach timer will continue to start. For example, the implicit detach timer will continue to count from the suspended time.

In an embodiment, in the operation process of any timer mentioned above, if the core network receives the registration area update message sent by the terminal, the core network can stop the timer or perform corresponding operations. For example, if the busy timer is started during a suspend period of the mobile reachable timer, and the registration area update message sent by the terminal is received during a counting period of the busy timer or the mobile reachable timer, the busy timer or the mobile reachable timer can be stopped. If the busy timer is started during a suspend period of the implicit detach timer, and the registration area update message sent by the terminal is received during a counting period of the busy timer or the implicit detach timer, the busy timer can be stopped or the implicit detach timer can be stopped, and a PPF corresponding to the terminal can be set.

Figure 6:
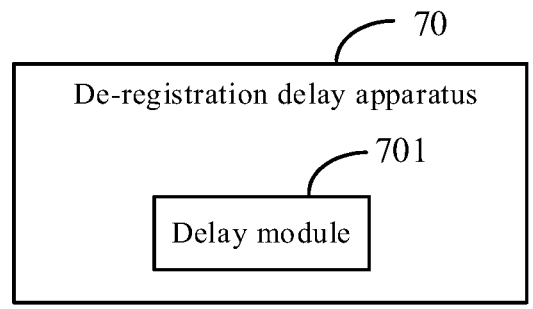
FIG. 6 is a schematic flowchart of another delay determination method illustrated according to an embodiment of the present disclosure.

FIG. 6 is a schematic flowchart of a delay determination method illustrated according to an embodiment of the present disclosure. The delay determination method shown in this embodiment can be applied to a terminal, including but not limited to a mobile phone, a tablet computer, a wearable device, a sensor, an Internet of Things device and other electronic devices. The terminal can be used as a user equipment to communicate with a core network, including but not limited to a 4G core network, a 5G core network and a 6G core network. In an embodiment, the core network may be a core network to which a delay determination method described in any of the above embodiments applies. The terminal may be a multi-SIM terminal, and is provided with at least a first SIM and a second SIM.

As shown in FIG. 6, the delay determination method may include the following steps:

at step S601, in response to determining a conflict between an operation of updating a registration area of the second SIM and a communication operation of the first SIM, a busy indication is sent to a core network corresponding to the second SIM.

The busy indication is used to request the core network to delay a determination process associated with a reachable state of the terminal.

In an embodiment, when the first SIM is communicating, the periodic registration update timer of the second SIM expires, so it is not convenient for the second SIM to initiate the registration area update to the corresponding core network. For example, if the registration area update is initiated, a communication service of the first SIM may be affected. Therefore, the terminal may send a busy indication to the core network corresponding to the second SIM through the second SIM.

After receiving the busy indication, the core network may delay a determination process associated with a reachable state of the terminal.

In an embodiment, the busy indication sent by the terminal is used to request the core network to suspend a mobile reachable timer or an implicit detach timer.

After receiving the busy indication, the core network can first determine the timer that is currently counting, for example, the mobile reachable timer or implicit detach timer, and then suspend the timer.

For example, it is possible to specifically determine which timer to be suspended according to whether the mobile reachable timer expires. In response to determining the mobile reachable timer corresponding to the terminal not expire, the mobile reachable timer is paused; and in response to determining the mobile reachable timer corresponding to the terminal not expire and if the implicit detach timer does not expire, the implicit detach timer is paused.

In an embodiment, the busy indication sent by the terminal to the core network includes a busy duration, and the busy indication is used to request the core network to suspend the determination process associated with the reachable state of the second SIM for the busy duration.

In an embodiment, the busy indication is used to request the core network to suspend mobile reachable timer or the implicit detach timer for the busy duration.

After receiving the busy indication, if the core network determines that the busy indication includes the busy duration, the core network can suspend the determination process associated with the reachable state of the terminal for the busy duration.

For example, in response to determining the mobile reachable timer corresponding to the terminal not expiring, the mobile reachable timer is suspended for the busy duration; and in response to determining the mobile reachable timer corresponding to the terminal expiring, the implicit detach timer is suspended for the busy duration.

Corresponding to the aforementioned embodiment of the delay determination method, the present disclosure further provides an embodiment of the delay determination apparatus.

Figure 7:
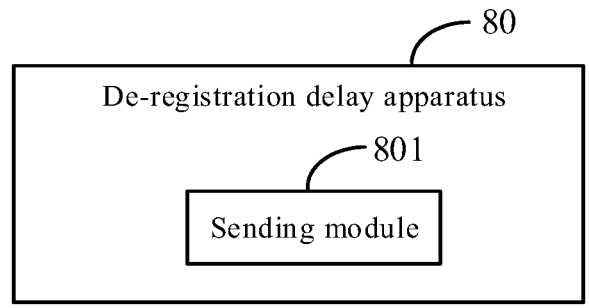
FIG. 7 is a schematic block diagram of a delay determination apparatus illustrated according to an embodiment of the present disclosure.

FIG. 7 is a schematic block diagram of a delay determination apparatus illustrated according to an embodiment of the present disclosure. The delay determination apparatus shown in this embodiment can be applied to a core network, including but not limited to a 4G core network, a 5G core network and a 6G core network. The core network can communicate with a terminal as user equipment, including but not limited to a mobile phone, a tablet computer, a wearable device, a sensor, an Internet of Things device and other electronic devices. In an embodiment, the terminal may be a terminal to which a delay determination apparatus in any subsequent embodiment applies.

As shown in FIG. 7, the delay determination apparatus may include:

a delay module 701, configured to in response to receiving a busy indication sent by a terminal, delay a determination process associated with a reachable state of the terminal.

In some examples, delay a determination process associated with a reachable state of the terminal includes:

suspending a mobile reachable timer or an implicit detach timer in the core network corresponding to the terminal.

In some examples, the delay module 701 is further configured to:

restart the mobile reachable timer in response to receiving a registration area update request of the terminal after suspending the mobile reachable timer or implicit detach timer.

In some examples, suspending a mobile reachable timer or an implicit detach timer in the core network corresponding to the terminal includes: in response to determining the mobile reachable timer corresponding to the terminal not expiring, suspending the mobile reachable timer; and in response to determining the mobile reachable timer corresponding to the terminal expiring, suspending the implicit detach timer.

In some examples, the busy indication includes a busy duration;

the delay a determination process associated with a reachable state of the terminal includes:

suspending the determination process associated with the reachable state of the terminal for the busy duration.

In some examples, suspending the determination process associated with the reachable state of the terminal for the busy includes:

suspending a mobile reachable timer or an implicit detach timer in the core network corresponding to the terminal for the busy duration.

In some examples, in response to determining the mobile reachable timer corresponding to the terminal not expiring, suspending the mobile reachable timer for the busy duration; and in response to determining the mobile reachable timer corresponding to the terminal expiring, suspending the implicit detach timer for the busy duration.

In some examples, suspending a mobile reachable timer or an implicit detach timer for the busy duration includes:

suspending the mobile reachable timer or the implicit detach timer;

starting a busy timer with a timing duration same as the busy duration; and in response to determining the busy timer expiring, continuing to start the mobile reachable timer or the implicit detach timer.

Figure 8:
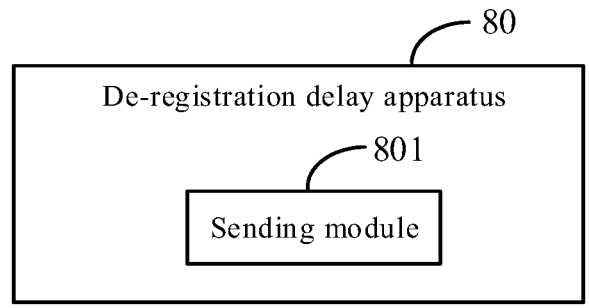
FIG. 8 is a schematic block diagram of another delay determination apparatus illustrated according to an embodiment of the present disclosure.

FIG. 8 is a schematic block diagram of a delay determination apparatus illustrated according to an embodiment of the present disclosure. The delay determination apparatus shown in this embodiment can be applied to a terminal, including but not limited to a mobile phone, a tablet computer, a wearable device, a sensor, an Internet of Things device and other electronic devices. The terminal can be used as a user equipment to communicate with a core network, including but not limited to a 4G core network, a 5G core network and a 6G core network. In an embodiment, the core network may be a core network to which a delay determination apparatus described in any of the above embodiments applies. The terminal may be a multi-SIM terminal, and is provided with at least a first SIM and a second SIM.

As shown in FIG. 8, the delay determination apparatus may include:

a sending module 801, configured to in response to determining a conflict between an operation of updating a registration area of the second SIM and a communication operation of the first SIM, send a busy indication to a core network corresponding to the second SIM;

where the busy indication is used to request the core network to delay a determination process associated with a reachable state of the terminal.

In some examples, the busy indication is used to request the core network to suspend a mobile reachable timer or an implicit detach timer.

In some examples, the busy indication includes a busy duration, and the busy indication is used to request the core network to suspend the determination process associated with the reachable state of the second SIM for the busy duration.

In some examples, the busy indication is used to request the core network to suspend a mobile reachable timer or an implicit detach timer for the busy duration.

Regarding the apparatus in the above embodiment, a specific way in which each module performs operations has been described in detail in the embodiment of related methods, and will not be described in detail here.

For the apparatus embodiment, because it basically corresponds to the method embodiment, it is only necessary to refer to the method embodiment for the relevant part of the description. The apparatus embodiments described above are only schematic, where the modules described as separate components may or may not be physically separated, and the components displayed as modules may or may not be physical modules. For example, they may be located in one place or distributed to a plurality of network modules. Some or all of the modules can be selected according to actual needs to achieve the purpose of this embodiment. It can be understood and implemented by a person of ordinary skill in the art without creative labor.

An embodiment of the present disclosure further proposes an electronic device, including:

a processor; and a memory, configured to store processor-executable instructions;

where the processor is configured to implement the delay determination method described above.

An embodiment of the present disclosure further proposes a computer-readable storage medium, on which a computer program is stored, which, when executed by a processor, realizes the steps in the delay determination method described above.

A specific embodiment of a delay determination method will be described below. It can be applied to a core network, including the following steps:

in response to receiving a busy indication sent by a terminal, delaying a determination process associated with a reachable state of the terminal.

In an embodiment, delaying a determination process associated with a reachable state of the terminal includes: suspending a mobile reachable timer or an implicit detach timer in the core network corresponding to the terminal.

In an embodiment, the method further includes: restarting the mobile reachable timer in response to receiving a registration area update request of the terminal after suspending the mobile reachable timer or implicit detach timer.

In an embodiment, suspending a mobile reachable timer or an implicit detach timer in the core network corresponding to the terminal includes:

in response to determining the mobile reachable timer corresponding to the terminal not expire, suspending the mobile reachable timer; and in response to determining the mobile reachable timer corresponding to the terminal expiring, suspend the implicit detach timer.

In an embodiment, the busy indication includes a busy duration, and delaying a determination process associated with a reachable state of the terminal includes: suspending the determination process associated with the reachable state of the terminal for the busy duration.

In an embodiment, suspending the determination process associated with the reachable state of the terminal for the busy duration includes: suspending a mobile reachable timer or an implicit detach timer in the core network corresponding to the terminal for the busy duration.

In an embodiment, in response to determining the mobile reachable timer corresponding to the terminal not expiring, suspending the mobile reachable timer for the busy duration; and in response to determining the mobile reachable timer corresponding to the terminal expiring, suspending the implicit detach timer for the busy duration.

In an embodiment, suspending a mobile reachable timer or an implicit detach timer for the busy duration includes:

suspending the mobile reachable timer or the implicit detach timer;

starting a busy timer with a same timing duration as the busy duration; and in response to determining the busy timer expiring, continuing to start the mobile reachable timer or the implicit detach timer.

A specific embodiment of a delay determination method will be described below. It can be applied to a terminal, in which at least a first SIM and a second SIM are set, including the following steps:

in response to determining a conflict between an operation of updating a registration area of the second SIM and a communication operation of the first SIM, sending a busy indication to a core network corresponding to the second SIM; where the busy indication is used to request the core network to delay a determination process associated with a reachable state of the terminal.

In an embodiment, the busy indication is used to request the core network to suspend a mobile reachable timer or an implicit detach timer.

In an embodiment, the busy indication includes a busy duration, and the busy indication is used to request the core network to suspend the determination process associated with the reachable state of the second SIM for the busy duration.

In an embodiment, the busy indication is used to request the core network to suspend a mobile reachable timer or an implicit detach timer for the busy duration.

A delay determination method and mechanism according to the present disclosure are briefly described below in combination with specific technical details, as follows:

When a first SIM in a connected state of the multi-SIM terminal is communicating with a first network, a second SIM in an idle state needs to update a registration area due to an expiration of a periodic registration update timer, but the multi-SIM terminal decides not to allow the second SIM to update the registration area due to the expiration of the periodic registration update timer, so the second SIM can send a busy indication to the second network.

If a mobile reachable timer has not expired, and if the busy indication is only a bit indication, the second network will suspend the mobile reachable timer after receiving the busy indication and wait for the second SIM to initiate the registration area update.

If the mobile reachable timer has not expired, and if the busy indication indicates a busy time at the same time, the second network will suspend the mobile reachable timer after receiving the busy indication, start the busy timer, and restart the mobile reachable timer after the busy timer expires.

If the mobile reachable timer has expired, and if the busy indication is only a bit indication, the second network will suspend the implicit detach timer after receiving the busy indication, and wait for the second SIM to initiate the registration area update.

If the mobile reachable timer has expired, and if the busy indication indicates the busy time at the same time, the second network will suspend the implicit detach timer after receiving the busy indication, start the busy timer, and restart the implicit detach timer after the busy timer expires.

Figure 9:
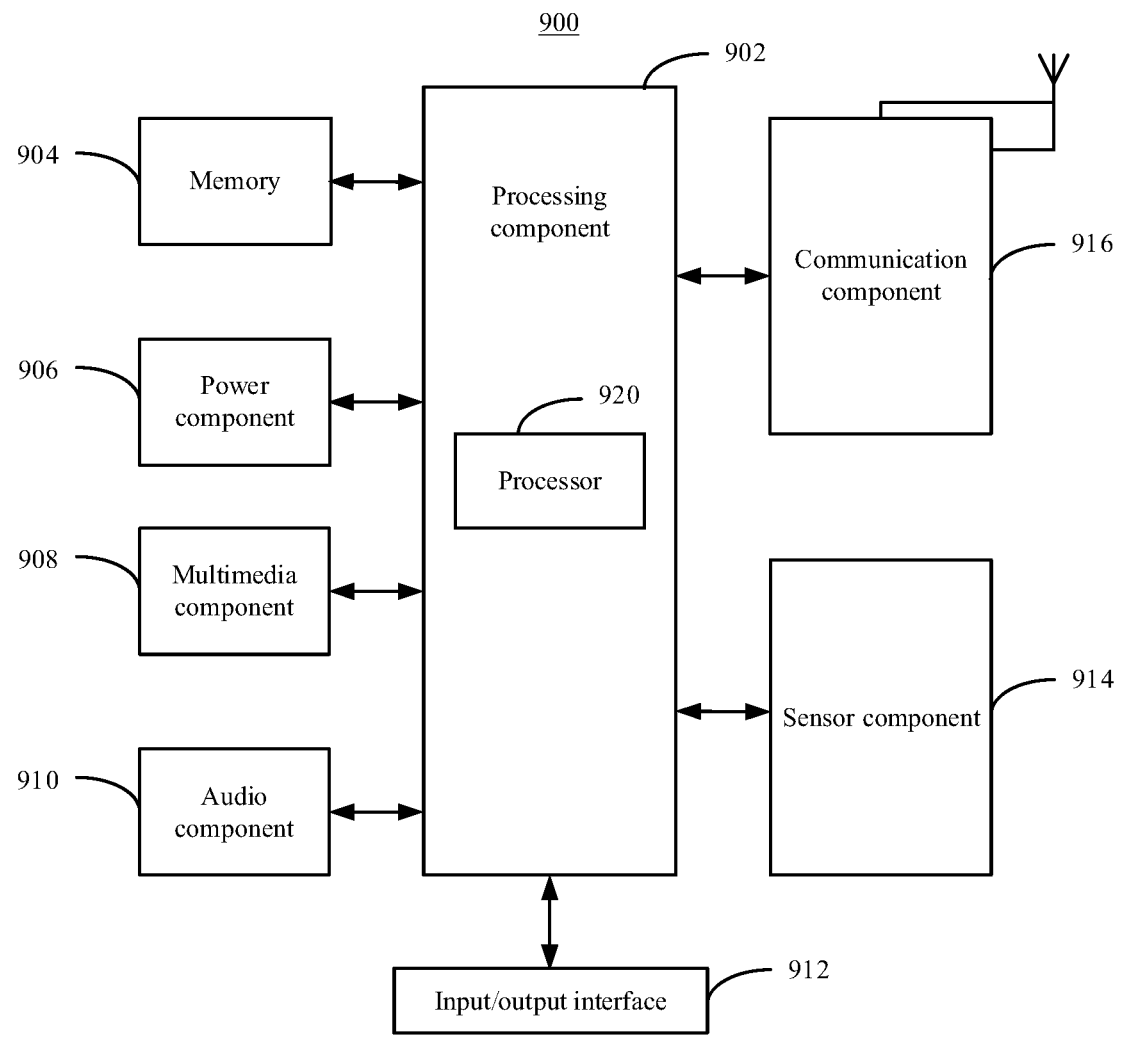
FIG. 9 is a schematic block diagram of an apparatus for delay determination illustrated according to an embodiment of the present disclosure.

FIG. 9 is a schematic block diagram of an apparatus 900 for delay determination illustrated according to an embodiment of the present disclosure. For example, the apparatus 900 may be a mobile phone, a computer, a digital broadcasting terminal, a messaging device, a game console, a tablet device, a medical device, a fitness device, a personal digital assistant, etc.

Referring to FIG. 9, the apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 generally controls the overall operation of the apparatus 900, such as operations associated with display, telephone call, data communication, camera operation and recording operation. The processing component 902 may include one or more processors 920 to execute instructions to complete all or part of steps of the above-mentioned delay determination method. In addition, the processing component 902 may include one or more modules to facilitate interactions between the processing component 902 and other components. For example, the processing component 902 may include a multimedia module to facilitate interactions between the multimedia component 908 and the processing component 902.

The memory 904 is configured to store various types of data to support operations in the apparatus 900. Examples of these data include instructions of any application program or method for being operated on the apparatus 900, contact data, phone book data, messages, pictures, videos, etc. The memory 904 can be implemented by any type of volatile or non-volatile memory device or combinations thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power component 906 provides power to various components of the apparatus 900. The power component 906 may include a power management system, one or more power supplies, and other components associated with generating, managing and distributing power for the apparatus 900.

The multimedia component 908 includes a screen that provides an output interface between the apparatus 900 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding and gestures on the touch panel. The touch sensor may not only sense a boundary of a touching or sliding action, but also detect a duration and a pressure related to the touching or sliding operation. In some embodiments, the multimedia component 908 includes a front camera and/or a rear camera. When the apparatus 900 is in an operation mode, such as a shooting mode or a video mode, the front camera and/or the rear camera can receive external multimedia data. Each front camera and rear camera may be a fixed optical lens system or have focal length and optical zoom capability.

The audio component 910 is configured to output and/or input audio signals. For example, the audio component 910 includes a microphone (MIC) configured to receive external audio signals when the apparatus 900 is in the operation mode, such as a calling mode, a recording mode and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, where the peripheral interface modules may be keyboards, click-wheels, buttons, etc. These buttons may include, but are not limited to: home button, volume button, start button and lock button.

The sensor component 914 includes one or more sensors for providing various aspects of state evaluation for the apparatus 900. For example, the sensor component 914 can detect an on/off state of the apparatus 900, a relative positioning of components, for example, the components are the display and the keypad of the apparatus 900, and the sensor component 914 can also detect a position change of the apparatus 900 or a component of the apparatus 900, presence or absence of user contact with the apparatus 900, orientation or acceleration/deceleration of the apparatus 900 and a temperature change of the apparatus 900. The sensor component 914 may include a proximity sensor configured to detect presence of a nearby object without any physical contact. The sensor component 914 may also include an optical sensor, such as a Complementary Metal-Oxide-Semiconductor (CMOS) or Charge-coupled Device (CCD) image sensor, for use in imaging applications. In some embodiments, the sensor component 914 may further include an acceleration sensor, a gyroscope sensor, a magnetic sensor, a pressure sensor or a temperature sensor.

The communication component 916 is configured to facilitate wired or wireless communication between the apparatus 900 and other devices. The apparatus 900 can access a wireless network based on communication standards, such as WiFi, 2G or 3G, 4G LTE, 5G NR or combinations thereof. In an exemplary embodiment, the communication component 916 receives a broadcast signal or broadcast related information from an external broadcast management system via a broadcast channel. In an exemplary embodiment, the communication component 916 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 900 may be implemented by one or more application-specific integrated circuits (ASIC), digital signal processors (DSP), digital signal processing devices (DSPD), programmable logic devices (PLD), field programmable gate arrays (FPGA), controllers, micro-controllers, micro-processors or other electronic components, for executing the above-mentioned delay determination method.

In an exemplary embodiment, a non-transitory computer-readable storage medium is further provided, such as the memory 904 including instructions, where the instructions can be executed by a processor 920 of the apparatus 900 to complete the above-mentioned delay determination method. For example, the non-transitory computer-readable storage medium may be a ROM, a random access memory (RAM), a Compact Disc Read-Only Memory (CD-ROM), a magnetic tape, a floppy disk, an optical data storage device, etc.

Other embodiments of the present disclosure will easily occur to those skilled in the art after considering the specification and practicing the disclosure disclosed herein. The present disclosure is intended to cover any variations, uses or adaptations of the present disclosure, and these variations, uses or adaptations follow general principles of the present disclosure and include common sense or common technical means in the technical field that are not disclosed in the present disclosure. The specification and embodiments are to be regarded as exemplary only, and true scope and spirit of the present disclosure are indicated by the following claims.

It should be understood that the present disclosure is not limited to the precise structures described above and shown in the accompanying drawings, and various modifications and changes can be made without departing from its scope. The scope of the present disclosure is limited only by the appended claims.

It should be noted that, relational terms here such as first and second are only used to distinguish one entity or operation from another entity or operation, and do not necessarily require or imply that there is any such actual relationship or order between these entities or operations. Terms "including," "containing," or any other variations thereof are intended to cover non-exclusive inclusion, so that a process, method, object, or device including a series of elements not only includes those elements, but also includes other elements not explicitly listed or elements inherent to such process, method, object or device. Without further limitations, an element defined by the phrase "including one" does not exclude the existence of other identical elements in the process, method, object, or device including the element.

The method and apparatus provided by the embodiment of the present disclosure are described in detail above, and the principle and implementation of the present disclosure are described with specific examples here. The description of the above embodiments is only used to facilitate understanding of the method and its core idea of the present disclosure; at the same time, according to the idea of the present disclosure, there will be changes in the specific implementation and application scope for those of ordinary skills in the art. To sum up, the contents of the present specification should not be understood as limitations to the present disclosure.

The invention claimed is:

1. A method for delay determination performed by a core network, the method comprising:
   in response to receiving a busy indication sent by a terminal, delaying a determination process associated with a reachable state of the terminal, wherein the delaying the determination process associated with the reachable state of the terminal comprises:
      suspending a mobile reachable timer or an implicit detach timer in the core network corresponding to the terminal,
   wherein suspending the mobile reachable timer or the implicit detach timer in the core network corresponding to the terminal comprises:
      in response to determining the mobile reachable timer corresponding to the terminal not expiring, suspending the mobile reachable timer; and
      in response to determining the mobile reachable timer corresponding to the terminal expiring, suspending the implicit detach timer.

2. The method according to claim 1, further comprising:
   restarting the mobile reachable timer in response to receiving a registration area update request of the terminal after suspending the mobile reachable timer or the implicit detach timer.

3. The method according to claim 1, wherein the busy indication comprises a busy duration;
   wherein the delaying the determination process associated with the reachable state of the terminal comprises:
   suspending the determination process associated with the reachable state of the terminal for the busy duration.

4. The method according to claim 3, wherein suspending the determination process associated with the reachable state of the terminal for the busy duration comprises:
   suspending the mobile reachable timer or the implicit detach timer in the core network corresponding to the terminal for the busy duration.

5. The method according to claim 4,
   in response to determining the mobile reachable timer corresponding to the terminal not expiring, suspending the mobile reachable timer for the busy duration; and
   in response to determining the mobile reachable timer corresponding to the terminal expiring, suspending the implicit detach timer for the busy duration.

6. The method according to claim 4, wherein the suspending the mobile reachable timer or the implicit detach timer corresponding to the terminal for the busy duration comprises:
   suspending the mobile reachable timer or the implicit detach timer;
   starting a busy timer with a timing duration same as the busy duration; and
   in response to determining the busy timer expiring, continuing to start the mobile reachable timer or the implicit detach timer.

7. A non-transitory computer-readable storage medium, on which a computer program is stored, wherein the computer program, when executed by a processor of the core network, causes the core network to perform the method according to claim 1.

8. A method for delay determination performed by a terminal that includes at least a first Subscriber Identity Module (SIM) and a second SIM, and the method comprising:
- in response to determining a conflict between an operation of updating a registration area of the second SIM and a communication operation of the first SIM, sending a busy indication to a core network corresponding to the second SIM,
- wherein the busy indication is used to request the core network to delay a determination process associated with a reachable state of the terminal;
- wherein the busy indication is used to request the core network to suspend a mobile reachable timer or an implicit detach timer,
- wherein in response to determining the mobile reachable timer corresponding to the terminal not expiring, the core network suspends the mobile reachable timer; and
- wherein in response to determining the mobile reachable timer corresponding to the terminal expiring, the core network suspends the implicit detach timer.

9. The method according to claim 8, wherein the busy indication comprises a busy duration, and the busy indication is used to request the core network to suspend the determination process associated with the reachable state of the second SIM for the busy duration.

10. The method according to claim 9, wherein the busy indication is used to request the core network to suspend the mobile reachable timer or the implicit detach timer for the busy duration.

11. A non-transitory computer-readable storage medium, on which a computer program is stored, wherein the computer program, when executed by a processor of the terminal, causes the terminal to perform the method according to claim 8.

12. An electronic device, comprising:
- a memory, configured to store processor-executable instructions; and
- one or more processors communicatively coupled to the memory,
- wherein the processor-executable instructions when collectively executed by the one or more processors cause the electronic device to act as the terminal and perform the method according to claim 8.

13. An electronic device, comprising:
- a processor; and
- a memory, configured to store processor-executable instructions;
- wherein the processor is configured to:
- in response to receiving a busy indication sent by a terminal, delay a determination process associated with a reachable state of the terminal;
- suspend a mobile reachable timer or an implicit detach timer corresponding to the terminal in a core network;
- in response to determining the mobile reachable timer corresponding to the terminal not expiring, suspend the mobile reachable timer; and
- in response to determining the mobile reachable timer corresponding to the terminal expiring, suspend the implicit detach timer.

14. The electronic device according to claim 13, wherein the processor is further configured to:
- restart the mobile reachable timer in response to receiving a registration area update request of the terminal after suspending the mobile reachable timer or the implicit detach timer.

15. The electronic device according to claim 13, wherein the busy indication comprises a busy duration;
and the processor is further configured to:
- suspend the determination process associated with the reachable state of the terminal for the busy duration.

\* \* \* \* \*